US011602958B2

(12) United States Patent
Druta et al.

(10) Patent No.: US 11,602,958 B2
(45) Date of Patent: Mar. 14, 2023

(54) ADAPTER, VALVE STEM, TIRE PARAMETER MONITORING SYSTEM, AND METHOD OF MOUNTING A TIRE PARAMETER MONITORING SYSTEM ONTO A WHEEL RIM

(71) Applicant: CONTINENTAL AUTOMOTIVE GMBH, Hannover (DE)

(72) Inventors: Paul Druta, Munich (DE); Ilie Atanasoe, Munich (DE)

(73) Assignee: Continental Automotive GmbH, Hannover (DE)

( * ) Notice: Subject to any disclaimer, the term of this patent is extended or adjusted under 35 U.S.C. 154(b) by 303 days.

(21) Appl. No.: 17/026,513

(22) Filed: Sep. 21, 2020

(65) Prior Publication Data

US 2021/0086570 A1 Mar. 25, 2021

(30) Foreign Application Priority Data

Sep. 20, 2019 (EP) .................................... 19465561
Nov. 25, 2019 (GB) .................................... 1917110

(51) Int. Cl.
*B60C 23/04* (2006.01)
*B60C 29/02* (2006.01)

(52) U.S. Cl.
CPC .......... *B60C 23/0494* (2013.01); *B60C 29/02* (2013.01)

(58) Field of Classification Search
CPC ............ B60C 23/0408; B60C 230/496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24;
(Continued)

(56) References Cited

U.S. PATENT DOCUMENTS 6,952,957 B2 10/2005 Kayukawa
7,059,178 B2 6/2006 Fischer
(Continued)

FOREIGN PATENT DOCUMENTS

CN 1792617 A 6/2006
CN 202029655 U 11/2011
(Continued)

*Primary Examiner* — Andre J Allen
(74) *Attorney, Agent, or Firm* — Laurence A. Greenberg; Werner H. Stemer; Ralph E. Locher

(57) ABSTRACT

A tire parameter monitoring system has an electronic module with a fitting for a snap-in valve, an adapter with first lamellae couplable to the fitting, a valve stem for a clamp-in valve with second lamellae that are interleavable with the first lamellae, and a pin. The first lamellae have a first hole extending substantially perpendicularly to a major surface of the first lamellae and the second lamellae have a second hole extending substantially perpendicularly to a major surface of the second lamellae. The first and second holes are aligned when the first and second lamellae are interleaved. The pin is inserted into the first and second holes to secure the adapter and the valve stem together and to allow rotational movement of the adapter and the valve stem around a longitudinal axis of the pin such that the valve stem is positionable at different angles to the electronic module.

15 Claims, 4 Drawing Sheets

(58) Field of Classification Search

CPC . B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0032; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC ................................................ 73/146–146.8

See application file for complete search history.

(56) References Cited

U.S. PATENT DOCUMENTS

| | | | |
|---|---|---|---|
| 7,126,489 B2 | 10/2006 | Tubb et al. | |
| 9,902,215 B2 | 2/2018 | Duffy et al. | |
| 10,549,586 B1 | 2/2020 | Mieyan | |
| 11,018,406 B2 | 5/2021 | Destraves et al. | |
| 2007/0295076 A1 | 12/2007 | Blossfeld et al. | |
| 2012/0118057 A1 | 5/2012 | Rigney et al. | |
| 2012/0137763 A1* | 6/2012 | Falkenborg | B60C 29/064 73/146.8 |
| 2019/0270351 A1 | 9/2019 | Peedikakkandy et al. | |
| 2022/0024265 A1* | 1/2022 | Haas | B60C 29/02 |
| 2022/0048341 A1* | 2/2022 | Druta | B60C 29/005 |

FOREIGN PATENT DOCUMENTS

| | | |
|---|---|---|
| CN | 202062964 U | 12/2011 |
| CN | 202186246 U | 4/2012 |

(56) References Cited

FOREIGN PATENT DOCUMENTS

| | | | | | |
|---|---|---|---|---|---|
| CN | 202186247 | U | | 4/2012 | |
| CN | 202656804 | U | | 1/2013 | |
| CN | 2015042543 | A | | 3/2015 | |
| CN | 204249747 | U | | 4/2015 | |
| CN | 104626892 | A | | 5/2015 | |
| CN | 106660415 | A | | 5/2017 | |
| CN | 109109581 | A | | 1/2019 | |
| CN | 110035911 | A | | 7/2019 | |
| DE | 4228008 | A1 | * | 3/1994 | ............... B60B 5/02 |
| DE | 19610376 | A1 | | 9/1997 | |
| EP | 1914093 | A1 | | 4/2008 | |
| EP | 2836377 | B1 | | 6/2016 | |
| EP | 3919297 | A2 | * | 12/2021 | |
| FR | 3058360 | A1 | | 5/2018 | |
| GB | 2580379 | A | * | 7/2020 | ......... B60C 23/0494 |
| JP | 2004203151 | A | | 7/2004 | |
| JP | 2007015534 | A | | 1/2007 | |
| JP | 2014117984 | A | | 6/2014 | |
| JP | 2015042543 | A | | 3/2015 | |
| JP | 2015058776 | A | | 3/2015 | |
| TW | 201007150 | A | | 2/2010 | |

* cited by examiner

ADAPTER, VALVE STEM, TIRE PARAMETER MONITORING SYSTEM, AND METHOD OF MOUNTING A TIRE PARAMETER MONITORING SYSTEM ONTO A WHEEL RIM

CROSS-REFERENCE TO RELATED APPLICATION

This application claims the priority, under 35 U.S.C. § 119, of European patent application EP 19465561, filed Sep. 20, 2019, and of British patent application GB 1917110.7, filed Nov. 25, 2019; the prior applications are herewith incorporated by reference in their entirety.

BACKGROUND OF THE INVENTION

Field of the Invention

The present invention relates to a system for measuring one or more parameters, in particular pressure, of a tire fitted to a vehicle wheel.

The system is used to inform the driver of any abnormal variation in the measured parameter, for example the tire pressure. Such systems typically include an inflation valve and an electronic module. The inflation valve is positioned in a bore or hole in the wheel rim and the electronic module is arranged inside the tire and is coupled with the inflation valve.

One type of tire parameter monitoring system or tire pressure monitoring system (TPMS) is known as the snap-in type, in which the inflation valve positioned on the outside of the wheel rim extends through a bore in the wheel rim and is connected to an electronic unit that is positioned on the inside of the wheel rim. Snap-in valves include an elastically deformable stem. An example of such a snap-in system is disclosed in the commonly assigned German published patent application DE 196 10 376 A1.

Another type of a tire parameter monitoring system is known as the clamp-in type. For the clamp-in type, it is possible to fasten the electronic module in various angular positions with respect to the wheel rim. This enables the system to be mounted on wheel rims of different designs. An example of such a clamp-in system is disclosed in the commonly assigned U.S. Pat. No. 7,059,178 B2.

Depending on various factors, a system of either the snap-in type or the clamp-in type may be desirable. In order to simplify assembly and reduce costs, it would be desirable to use components for both snap-in type and clamp-in type tire parameter monitoring systems.

BRIEF SUMMARY OF THE INVENTION

It is accordingly an object of the invention to provide tire monitoring system and related features which overcome a variety of disadvantages of the heretofore-known devices and methods.

With the above and other objects in view there is provided, in accordance with the invention, a tire parameter monitoring system, comprising:

an electronic module with a fitting for a snap-in valve;

an adapter configured for coupling to the fitting, the adapter having a number of first lamellae;

a valve stem for a clamp-in valve, the valve stem having a number of second lamellae configured for interleaving with the first lamellae;

the first lamellae being formed with a first hole extending substantially perpendicularly to a major surface of the first lamellae;

the second lamellae being formed with a second hole extending substantially perpendicularly to a major surface of the second lamellae; and the first and second holes being aligned with one another when the second lamellae are interleaved with the first lamellae; and a pin for insertion into the first hole and the second hole to secure the adapter and the valve stem to one another and to allow rotational movement of the adapter and the valve stem about a longitudinal axis of the pin, to enable a positioning of the valve stem at different angles relative to the electronic module.

According to a first aspect of the invention, a tire parameter monitoring system, in particular a tire pressure monitoring system, is provided that comprises an electronic module with a fitting for a snap-in valve, an adapter, a valve stem for a clamp-in valve and a pin. The adapter comprises a plurality of first lamellae and is couplable to the fitting of the electronic module. The valve stem has a plurality of second lamellae that are interleavable with the plurality of first lamellae of the adapter. The first lamellae each comprise a first hole extending substantially perpendicularly to a major surface of the first lamellae and the second lamellae each comprise a second hole extending substantially perpendicularly to a major surface of the second lamellae, the first and second holes being aligned when the second lamellae are interleaved with the first lamellae. The pin is insertable into the first hole and second hole when the second lamellae are interleaved with the first lamellae to secure the adapter and the valve stem together and to allow rotational movement of the adapter and the valve stem around a longitudinal axis of the pin such that the valve stem is positionable at different angles to the adapter and to the electronic module.

The system may be considered to include an adapter which provides a pin joint between a valve stem and an electronic module by the use of the second lamellae extending from the valve stem and the first lamellae extending from the adapter. The first and second lamellae and, therefore, the adapter and the valve stem are rotatable about the longitudinal axis of the pin so that the valve stem is positionable at different angles to the adapter and at different angles to the electronic module. Thus, a clamp-in valve can be used with the valve stem and with the electronic module having a fitting for a snap-in valve. The electronic module can, therefore, be used with both snap-in valves and clamp-in valves.

As the valve stem for the clamp-in valve is positionable at different angles to the electronic module, the system enables a clamp-in valve to be used for wheel rims of differing designs which require differing angles between the valve stem and the electronic module.

In an embodiment, the tire parameter monitoring system further comprises a nut, a washer and a seal. The position of the valve stem with respect to the electronic module is fixed by securing the nut, the washer and the seal onto the interleaved first and second lamellae, whereby the pin is positioned in and extends through the first and second holes, such that the seal and washer provide an inwardly acting force on the interleaved first and second lamellae that prevents relative movement of the first and second lamellae and, therefore, of the valve stem and the adapter about the longitudinal axis of the pin.

The seal and the washer may each have a ring shape with an inner diameter such that, when the seal and the washer are secured by the nut onto the interleaved first and second lamellae of the adapter and the valve stem, rotational movement of the plurality of first lamellae and the plurality of second lamellae about the longitudinal axis of the pin is prevented. The diameter of the aperture of the ring-shaped seal and washer may be selected such that the seal and washer cause an inwardly acting force on the interleaved first and second lamellae that prevents relative movement of the first and second lamellae and, therefore, of the valve stem and the adapter about the longitudinal axis of the pin.

In some embodiments, each of the first lamellae has the form of a flat plate that protrudes from a common base formed as part of the adapter and each of the second lamellae has the form of a flat plate that protrudes from a common base that is formed as part of the valve stem. The major surfaces of the flat plates are substantially parallel to one another. The flat plates of each of first and second lamellae are sized and shaped and spaced apart such that the plurality of second lamellae are interleavable with the plurality of first lamellae.

The spacing between adjacent ones of the first lamellae, i.e. the spacing between the major surfaces of adjacent ones of the first lamellae, may be slightly greater than the thickness of the second lamellae. Similarly, the spacing between major surfaces of adjacent ones of the second lamellae be may slightly greater than the thickness of each of the first lamellae. This enables one first lamella to be positioned between two adjacent second lamellae and one second lamella to be positioned between adjacent first lamellae in order that the first and second lamellae can be interleaved with one another and the major surfaces of the first and second lamellae are substantially parallel to one another. The length and width of the each of the flat plates of the first and second lamellae may be selected to enable the first and second lamellae to be interleaved with one another. The first and second holes are positioned in the first and second lamellae respectively such that the first and second holes can be aligned to form a common bore having a longitudinal axis extending along its length that extends substantially perpendicularly to the major surfaces of the first and second lamellae.

The common bore can accept a pin that extends through the entire stack of interleaved first and second lamellae to form a pin joint having a longitudinal axis, whereby the first lamellae and the second lamellae are rotatable about the longitudinal axis such that the angle between the first and second lamellae about the longitudinal axis can be varied. The first and second holes may also have approximately that same diameter and have a diameter that is slightly greater than the diameter of the pin so that a pin joint can be formed that allows rotational movement of the first and second lamellae about the longitudinal axis of the pin so that the angle between the first and second lamellae and consequently the angle between the adapter and the valve stem can be varied as the first lamellae are fixedly attached to the adapter and the second lamellae are fixedly attached to the valve stem.

In some embodiments, the number of second lamellae is n and the number of first lamellae is n+1, wherein n represents a natural number. In some embodiments, the relationship between the number of first and second lamellae is reversed so that the number of first lamellae is n and the number of second lamellae is n+1. In some embodiments n≥3, or 5 or 7.

In some embodiments, a single first lamella or a single second lamella may be used, i.e. the number of second lamellae is 1 and the number of first lamellae is 2, or the number of first lamellae is 1 and the number of second lamellae is 2.

In some embodiments, the adapter further comprises a connection stem that is couplable to the fitting of the electronic module. The connection stem may oppose the second lamellae.

In some embodiments, the fitting for a snap-in valve in the electronic module comprises an aperture. The connection stem may be aligned with the aperture or be positioned in and extend through the aperture.

In some embodiments, the connection stem comprises an inner thread and is engaged with a screw to secure the connection stem and the adapter to the fitting and the electronic module. The connection stem and the screw are positioned on opposing sides of the aperture of the fitting.

The connection stem may extend through the aperture from a first side of the fitting and be secured to the fitting by a screw engaging with the inner thread, the screw being positioned on a second side of the fitting that opposes the first side. In use and when assembled, the screw is positioned within the tire and the connection stem extends through the wheel rim such that the first lamellae are positioned on the outside of the wheel rim.

In some embodiments, the fitting comprises a mounting plate in which the aperture is positioned and may further comprise one or more lateral gusset plates. The mounting plate and the lateral gusset plates may extend substantially perpendicularly to the upper surface of the housing of the electronic module. The lateral gusset plate(s) may be positioned at the end(s) of the mounting plate and provide mechanical support for the mounting plate. The fitting may have an L-shape in plan view in the case of one lateral gusset plate, or a U-shape in plan view in the case of two lateral gusset plates.

In some embodiments, the electronic module includes a housing that accommodates a tire pressure sensor unit.

The invention also provides in a second aspect an adapter for mounting a clamp-in valve on a snap-in electronic module of a tire parameter monitoring system, whereby the clamp-in valve is variably positionable with respect to the snap-in electronic module. The adapter comprises a plurality of first lamellae and a connection stem, the connection stem being adapted to be secured to the snap-in electronic module. The first lamellae extend from the adapter and each comprise a first hole extending substantially perpendicularly to a major surface of the first lamellae, the first lamellae being adapted to be interleavable with a plurality of second lamellae extending from a valve stem of a clamp-in valve such that the adapter is positionable at different angles relative to the valve stem.

The connection stem may have an outer dimension, for example an outer diameter, that is adapted to fit within an aperture of the snap-in electronic module. The connection stem may be securable to the snap-in electronic module by a screw arranged on an opposing side of the ring that is engageable with the inner thread of the connection stem.

The invention also provides in a further aspect a valve stem for a clamp-in valve, the valve stem comprising a plurality of second lamellae. The second lamellae extend from the valve stem and each comprises a second hole extending substantially perpendicularly to a major surface of the second lamellae. The second lamellae are adapted to be interleavable with a plurality of first lamellae extending from an adapter for a snap-in electronic module such that the valve stem is positionable at different angles to the adapter.

The second hole is sized and arranged to be alignable with first holes positioned in each of the first lamellae so that the first and second holes can be aligned along a common axis when the first and second lamellae are interleaved and a pin can be inserted into the first and second holes that extends along the common axis.

The valve stem and the adapter may be provided together in the form of a kit of parts, optionally also with a pin, for use with an electronic module having a fitting for a snap-in sensor and with a clamp-in valve.

The system according to the invention may be provided in the form of a kit of parts for assembly on a wheel rim.

With the above and other objects in view there is also provided, in accordance with the invention, a method for mounting a tire parameter monitoring system to a wheel rim. The method comprises providing an adapter having a plurality of first lamellae and a connection stem, wherein the first lamellae comprise a first hole extending substantially perpendicularly to a major surface of the first lamellae, interleaving the first lamellae with second lamellae of a valve stem, wherein the second lamellae comprise a second hole extending substantially perpendicularly to a major surface of the second lamellae, aligning the first and second holes, inserting a pin into the first and second holes and securing the adapter and the valve stem together so to allow rotational movement of the adapter and the valve stem around a longitudinal axis of the pin such that the valve stem is positionable at different angles to the electronic module, securing the connection stem of the adapter to a snap-in electronic module, inserting the valve stem into a hole in an outer surface of the wheel rim, placing a nut over the valve stem and securing the valve stem to the rim by tightening the nut.

Thus, a clamp-in type valve stem is coupled to a snap-in electronic module by means of the adapter. The adapter enables the valve stem to be positioned at different angles with respect to the electronic module by means of the pin joint formed between the first lamellae of the adapter and the second lamellae of the valve stem. The angle between the connection stem of the adapter and the snap-in electronic module is fixed.

In an embodiment, the method further comprises placing a seal and a washer over the valve stem. After forming an assembly by coupling the adapter with the valve stem and with the electronic module, the valve stem is inserted into a hole in the wheel rim and secured to the wheel rim by the nut engaging with the seal and the washer.

The nut may be secured onto the washer and the seal such that the seal and the washer provide an inwardly acting force on the interleaved first and second lamellae that prevents relative movement of the first and second lamellae about the longitudinal axis of the pin and consequently fixes the position of the valve stem with respect to the electronic module.

The washer and seal may each have an inner diameter that is selected to provide an inwardly acting force on the interleaved first and second lamellae when they are placed over the interleaved first and second lamellae and secured by the nut.

The connection stem may be secured to the snap-in electronic module by a screw connection. For example, the connection stem may be inserted into an aperture in the snap-in electronic module and engaged to the snap-in electronic module by means of a screw positioned on the opposing side of the aperture that engages with an inner thread of the connection stem. In some embodiments, the connection stem comprises an outer thread which is engaged with a nut positioned on the opposing side of the aperture.

The pin joint formed between the first and second lamellae also provides a self-adjustment mechanism to fix the angle between the valve stem and the electronic module when the valves stem and the electronic module are engaged with the wheel rim. This joint fixes the position of the sensor on the wheel rim during spinning. As the valve stem is placed on the wheel rim, the valve angle can be easily adjusted by rotational movement around the longitudinal axis of the pin in order to fit the electronic module onto the wheel rim. After the initial fitting has been completed and the electronic module touches the wheel rim well, the nut positioned on the opposing side of the wheel rim is tightened to clamp the sealing washer onto the interleaved lamellae and pin and onto the wheel rim. This also has the effect of exerting pressure on interleaved first and second lamellae and blocks the rotation of the valve stem around the pin so as to provide an auto locking mechanism. The torque applied to the nut may be around 8 Nm, which is sufficient to maintain the valve stem and the sensor in the desired position during high acceleration spinning.

The electronic unit module can be used with a snap-in type of valve and a clamp-in type of valve while maintaining the flexible positioning, in particular, the variable angle between the clamp-in valve and the electronic module.

Other features which are considered as characteristic for the invention are set forth in the appended claims.

Although the invention is illustrated and described herein as embodied in adapter, valve system, tire parameter monitoring system and method for mounting a tire parameter monitoring system onto a wheel rim, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
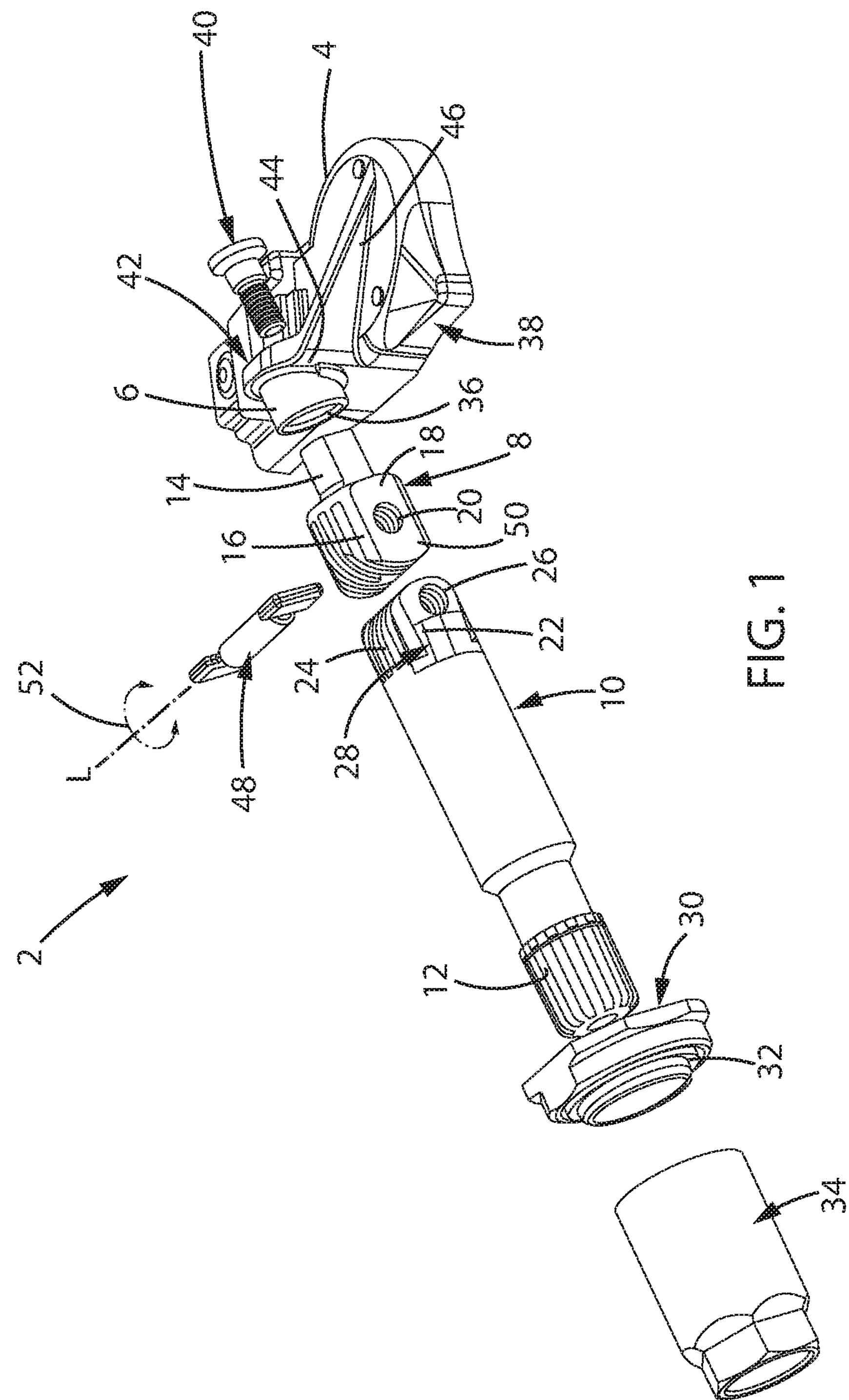
FIG. 1 illustrates an exploded view of the parts of a tire parameter monitoring system according to an embodiment of the invention.
Figure 2:
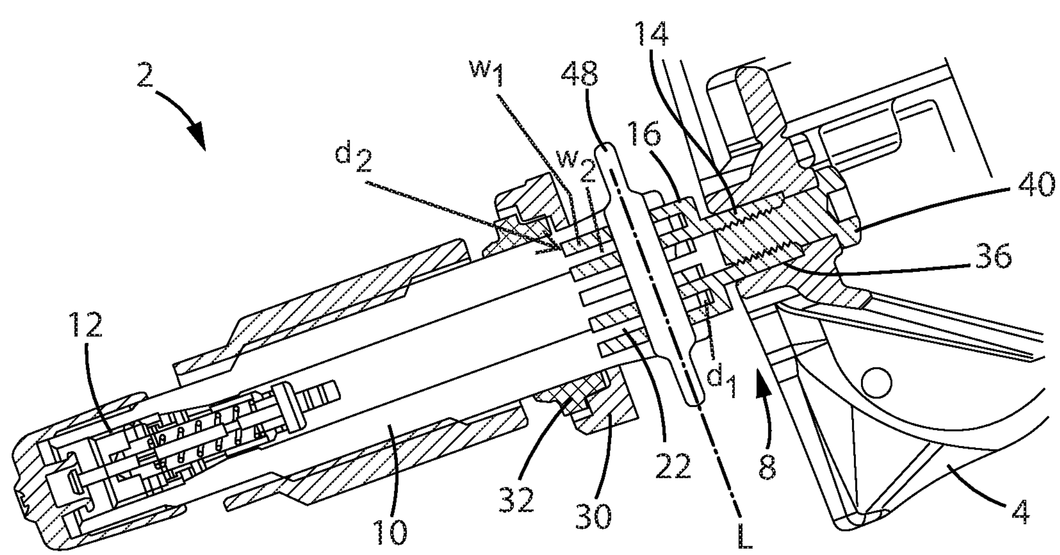
FIG. 2 illustrates a cross-sectional view of the assembled tire parameter monitoring system of FIG. 1.
Figure 3:
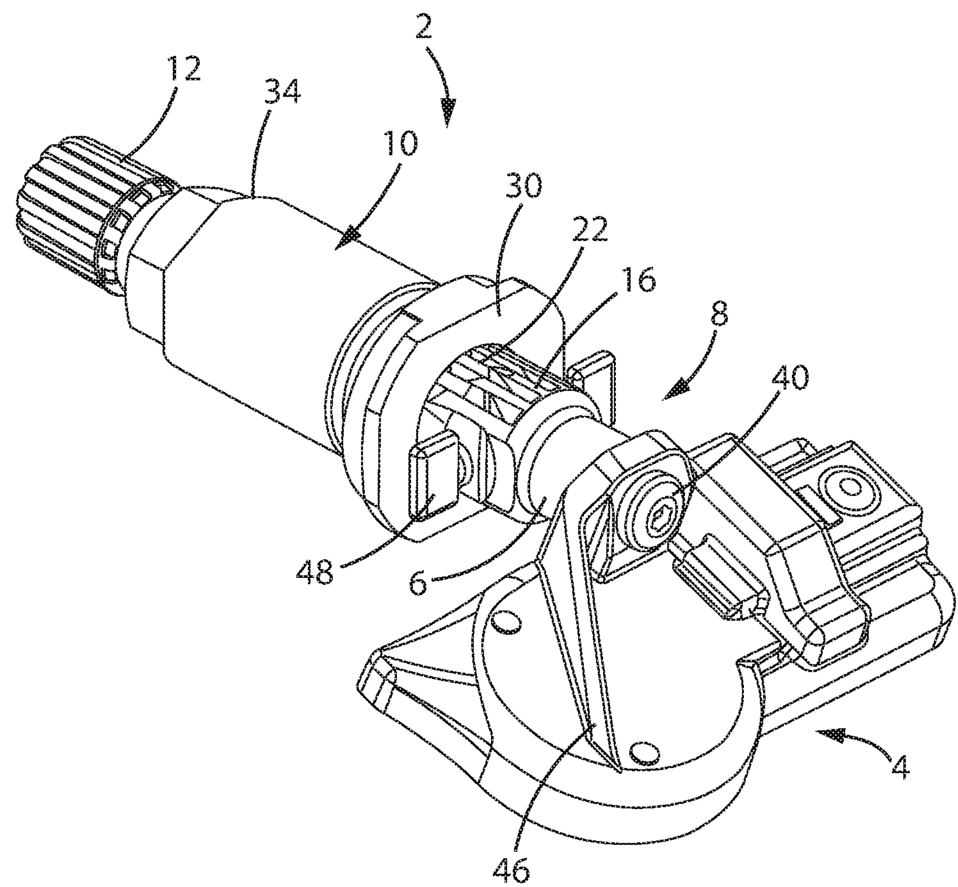
FIG. 3 illustrates a perspective view of the assembled tire parameter monitoring system of FIG. 1.

Referring now to the figures of the drawing in detail, FIG. 1 shows an exploded view of the components of a tire parameter monitoring system 2, in particular a tire pressure monitoring system (TPMS), according to an embodiment of the invention. FIG. 2 illustrates a cross-sectional view and FIG. 3 illustrates a perspective view of the assembled tire parameter monitoring system 2 of FIG. 1.

The tire parameter monitoring system 2 includes an electronic module 4 which includes a fitting 6 for a snap-in valve, an adapter 8 that can be coupled to the fitting 6 and, therefore, to the electronic module 4 and a valve stem 10 for a clamp-in valve 12. The electronic module 4 includes a housing in which the electronics for a sensor for the tire parameter monitoring system are positioned. The sensor may be a tire pressure sensor.

The adapter 8 has a connection stem 14 which is adapted to be connectable to the fitting 6 of the electronic module 4. In this embodiment, the connection stem 14 has an elongate rod shape and has an outer diameter such that the connection stem 14 can be inserted into an aperture 36 of the fitting 6. The adapter 8 further includes a plurality of first lamellae 16 that extend from the opposing end of the adapter 8 to the connection stem 14.

Each of the first lamellae 16 has the form of a flat plate 50 that extends from a common base to form a plurality of straight teeth or tines that are spaced apart from one another. The major surfaces 18 of the flat plates 50 are substantially parallel to one another and include a first hole 20. The first holes 20 of each of the first lamellae 16 are aligned on a common axis and together form a bore for accepting a pin 48 of a pin joint. The distal ends of the first lamellae 16 may be rounded and have a concave shape and the base of the adapter 8 between adjacent first lamellae 16 may have a convex shape.

The valve stem 10 has a substantially elongate shape and includes a plurality of second lamellae 22 at its inner end that are spaced apart from one another and connected to the valve stem 10 at the base. The clamp-in valve 12 is inserted into the opposing end of the valve stem 10. The second lamellae 22 also have the form of a flat plate 24 each including a second hole 26 in a major surface 28. The second holes 26 are aligned on a common axis and together form a bore for accepting the pin 48 of the pin joint. The distal ends of the second lamellae 22 are rounded, for example concave, and the base of the connecting portions between adjacent second lamellae 22 may have a convex shape.

The first lamellae 16 have a width $w_1$ and a spacing $d_1$ between adjacent first lamellae and the second lamellae 22 have a width $w_2$ and a spacing $d_2$ between adjacent second lamellae. The width $w_1$ of the first lamellae 16 is less than the spacing $d_2$ between adjacent second lamellae 22 and the width $w_2$ of the second lamellae 22 is less than the spacing $d_1$ between adjacent first lamellae 16 so as to enable the first lamellae 16 and the second lamellae 22 to be alternatively interleaved to form a stack of alternate first and second lamellae 16, 22.

The tire parameter monitoring system 2 also includes a washer 30, a seal 32 and a nut 34 which are adapted to fit over the valve stem 10.

In some embodiments, the fitting 6 of the snap-in electronic module 4 includes an aperture 36. In some embodiments, the fitting 6 includes a mounting plate 44 which may be supported by one or more lateral gussets 46. The aperture 36 may be positioned in the mounting plate 44. The connection stem 14 is aligned with, and may extend through, the aperture 36 at an outer side 38 of the fitting 6. The connection stem 14 may include an inner thread which is coupled to a screw 40 positioned on an opposing inner side 42 of the fitting 6 in order to secure the adapter 8 to the electronic module 4 and fix the position of the adapter 8 with respect to the electronic module 4.

As is illustrated in the assembly views depicted in FIGS. 2 and 3, the valve stem 10 may be mechanically coupled with the adapter 8 by inserting the second lamellae 22 between the first lamellae 16 of the adapter 8 such that the first and second lamellae 16, 22 are interleaved and such that the first holes 20 are aligned with the second holes 26 to form a common bore having a longitudinal axis. The pin 48 can be inserted into the common bore such that the first and second lamellae 16, 22 and consequently the valve stem 10 and the adapter 8 are rotatable about the longitudinal axis L of the pin 48. The pin 48 can be secured within the common bore by use of caps having at least one dimension which is greater than the diameter of the common bore.

The joint provided between the first and second lamellae 16, 22 by the pin 48 enables the angle between the valve stem 10 and the electronic unit 4 to vary, as indicated by the arrow 52, thus enabling the tire parameter monitoring system 2 to be used on different types of wheel rim. In operation, the electronic module 4 and a base portion of the connection stem 14 are positioned on an inner surface of the wheel rim and within the tire. The valve stem 10, washer 30, seal 32 and nut 34 are positioned on the outer surface of the wheel rim.

The first and second lamellae 16, 22 may each have a length such that when the first and second holes 20, 26 are aligned, the distal end of the first lamellae 16 is spaced apart from the base extending between the second lamellae 22 and vice versa. In some embodiments, the curved shape of the distal end may be formed such that a mechanical stop function is provided which limits the extent of the rotation around the longitudinal axis L of the pin 48.

The tire parameter monitoring system 2 enables the clamp-in valve 12 and valve stem 10 to be mounted at an adjustable angle on a wheel rim by means of the pin joint formed between the first lamellae 16 of the adapter 8 and the second lamellae 22 of the valve stem 10. The angular position between the valve stem 10 and the electronic module 4 is variable about the longitudinal axis L of the pin 48, as indicated by the arrow 52. The clamp-in valve 12 can be mounted on the wheel rim at a convenient angle for the best fitment due to the variable positioning of the valve stem 10.

Figure 4A:
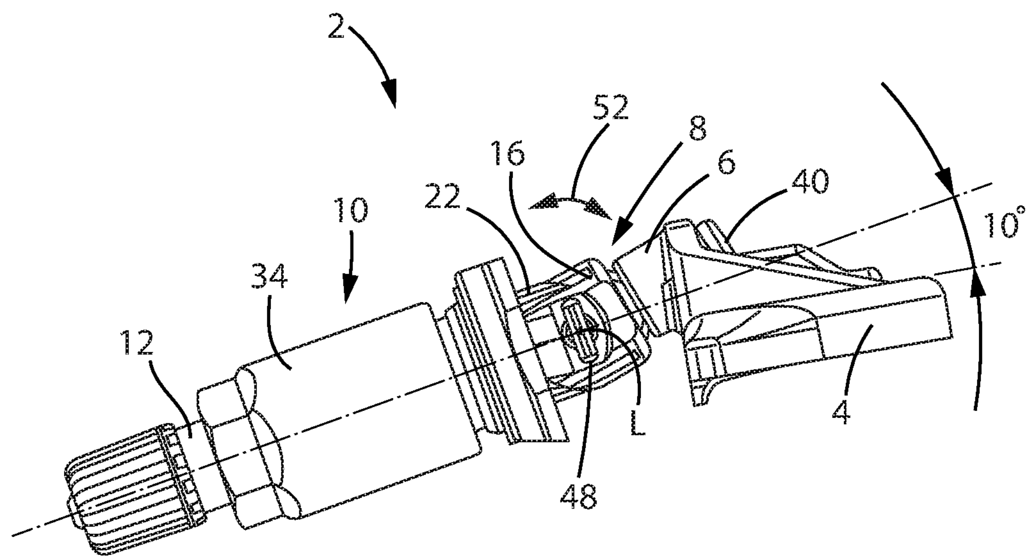
FIG. 4A illustrates a side view of the tire pressure monitoring system with a first angle between the valve stem and the electronic module.
Figure 4B:
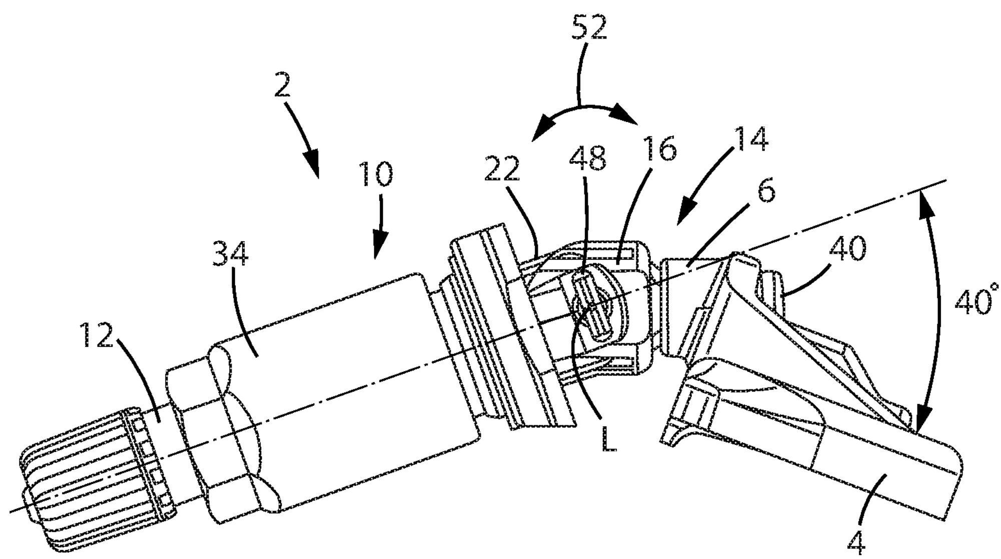
FIG. 4B illustrates a side view of the tire pressure monitoring system with a second angle between the valve stem and the electronic module.

FIG. 4A illustrates the electronic module 4 coupled with a valve 10 with a first angle of approximately 10° between the longitudinal axis of the valve stem and the upper surface of the electronic module 4. FIG. 4B illustrates the electronic module 4 coupled with the valve stem 10 at a second angle of approximately 40° between the longitudinal axis of the valve stem and the upper surface of the electronic module 4. The angle about the longitudinal axis L of the pin 48 that is variable is indicated by the double arrow 52.

Since the electronic module 4 has not been modified and includes a fitting of the snap-in type, it can be used for a snap-in valve as well as a clamp-in valve by means of the adapter 8 and valve stem 10 disclosed herein, thus reducing the number of parts which are required to produce both types of system. Additionally, the clamp-in valve stem 10 can be mounted at different angular positions with respect to the electronic module 4 so that the tire parameter monitoring system 2 can be used with different wheel rims with a clamp-in valve.

The tire parameter monitoring system 2 is mounted on the wheel rim by placing the washer 30 and the seal 32 onto the valve stem 10 and coupling the adapter 8 with the valve stem 10 and with the electronic module 4 to form an assembly. The valve stem 10 of the assembly is inserted into a hole in the wheel rim.

The adapter 8 is secured to the electronic module 4 by securing the connection stem 14 to the snap-in fitting 6 of the electronic module 4 positioned on an inner surface of the wheel rim. This may be performed by inserting the connection stem 14 into the aperture 36 in the fitting 6 and engaging the screw 40 with the inner thread of the connection stem 14 to secure the connection stem 14 and the adapter 8 to the outer side 38 of the fitting with the head of the screw 40 being engaged with the inner side 42 of the fitting 6.

The adapter 8 may be coupled to the valve stem 10 by interleaving the first lamellae 16 of the adapter 8 with the second lamellae 22 of the valve stem 10 so that the first and second holes 20, 26 are aligned. The pin 48 is inserted into the common bore formed by the first and second holes 20, 26. In this partially assembly state, the arrangement allows rotational movement of the adapter 8 and the valve stem 10 around a longitudinal axis L of the pin 48 as indicated by the arrow 52 such that the valve stem 10 is positionable at different angles to the electronic module 4.

The valve stem 10 is inserted to the hole in the wheel rim, the nut 34 is placed over the valve stem 10 and tightened to mount the tire parameter monitoring system 2 to the wheel rim. This tightening of the nut 34 exerts an inwardly acting force onto the interleaved first and second lamellae 16, 22 so that further rotation around the longitudinal axis L of the pin 48 is prevented and the angle between the valve stem 10 and the electronic module 4 is fixed.

The following is a summary list of reference numerals and the corresponding structure used in the above description of the invention:

2 tire parameter monitoring system
4 electronic module
6 fitting
8 adapter
10 valve stem
12 clamp-in valve
14 connection stem
16 first lamella
18 major surface
20 first hole
22 second lamella
24 flat plate
26 second hole
28 major surface
30 washer
32 seal
34 nut
36 aperture
38 outer side
40 screw
42 inner side
44 mounting plate
46 lateral gusset
48 pin
50 flat plate
52 arrow
$d_1$ spacing between first lamellae
$d_2$ spacing between second lamellae
$w_1$ width (thickness) of first lamellae
$w_2$ width (thickness) of second lamellae

The invention claimed is:

1. A tire parameter monitoring system, comprising:
- an electronic module with a fitting for a snap-in valve;
- an adapter configured for coupling to said fitting, said adapter having a number of first lamellae;
- a valve stem for a clamp-in valve, said valve stem having a number of second lamellae configured for interleaving with said first lamellae;
- said first lamellae being formed with a first hole extending transverse to a major surface of said first lamellae;
- said second lamellae being formed with a second hole extending transverse to a major surface of said second lamellae; and
- said first and second holes being aligned with one another when said second lamellae are interleaved with said first lamellae; and
- a pin for insertion into said first hole and said second hole to secure said adapter and said valve stem to one another and to allow rotational movement of said adapter and said valve stem about a longitudinal axis of said pin, to enable a positioning of said valve stem at different angles relative to said electronic module.

2. The tire parameter monitoring system according to claim 1, further comprising a nut, a washer, and a seal, wherein a position of said valve stem with respect to said electronic module is fixed by securing said nut, said washer, and said seal onto the interleaved first and second lamellae, with said seal and said washer providing an inwardly acting force on the interleaved first and second lamellae to prevent a relative movement about the longitudinal axis of said pin.

3. The tire parameter monitoring system according to claim 2, wherein said seal and said washer have inner diameters to prevent a rotational movement of said first lamellae and said second lamellae about the longitudinal axis of said pin when said seal and said washer are secured by said nut onto the interleaved first and second lamellae.

4. The tire parameter monitoring system according to claim 1, wherein each of said first lamellae has a shape of a flat plate that protrudes from a common base and each of said second lamellae has a shape of a flat plate that protrudes from a common base, and wherein said flat plates are sized, shaped, and spaced apart such that said second lamellae are interleavable with said first lamellae.

5. The tire parameter monitoring system according to claim 1, wherein said adapter comprises a connection stem to be coupled to said fitting said electronic module.

6. The tire parameter monitoring system according to claim 5, wherein said fitting is formed with an aperture and said connection stem extends through said aperture.

7. The tire parameter monitoring system according to claim 5, wherein said connection stem is formed with an inner thread and is securable to said fitting by a screw meshing with said inner thread, said screw being positioned at said fitting opposite from said connection stem.

8. The tire parameter monitoring system according to claim 7, wherein said fitting comprises a mounting plate formed with said aperture and one or more lateral gusset plates.

9. The tire parameter monitoring system according to claim 1, wherein said electronic module accommodates a tire pressure sensor unit.

10. An adapter for mounting a clamp-in valve on a snap-in electronic module of a tire parameter monitoring system with variable positioning of the clamp-in valve with respect to the snap-in electronic module, the adapter comprising:
- a number of first lamellae and a connection stem, the connection stem being configured to be secured to the snap-in electronic module;
- said first lamellae extending from the adapter and each being formed with a first hole extending transverse to a major surface of said first lamellae, said first lamellae being configured to be interleavable with a number of second lamellae extending from a valve stem for a clamp-in valve, enabling the adapter to be positioned at different angles relative to the valve stem.

11. A valve stem for a clamp-in valve, the valve stem comprising:

a number of second lamellae, said second lamellae extending from the valve stem and each being formed with a second hole extending transverse to a major surface of said second lamellae;

said second lamellae being configured to be interleavable with a number of first lamellae extending from an adapter for a snap-in electronic module, and enabling the valve stem to be positioned at different angles relative to the adapter.

12. A method of mounting a tire parameter monitoring system to a wheel rim, the method comprising:

providing an adapter having a number of first lamellae and a connection stem, wherein the first lamellae are formed with a first hole extending transverse to a major surface of the first lamellae;

interleaving the first lamellae with second lamellae of a valve stem, wherein the second lamellae are formed with a second hole extending transverse to a major surface of the second lamellae;

aligning the first and second holes;

inserting a pin through the first and second holes and securing the adapter and the valve stem to one another so to allow rotational movement of the adapter and the valve stem about a longitudinal axis of the pin, enabling the valve stem to be positioned at different angles relative to the electronic module;

securing the connection stem to a snap-in electronic module;

inserting the valve stem into a hole in an outer surface of the wheel rim;

placing a nut over the valve stem; and securing the valve stem to the rim by tightening the nut.

13. The method according to claim 12, further comprising:

placing a seal and a washer over the valve stem positioned on an outer surface of the wheel rim and onto the interleaved first and second lamellae; and securing the nut onto the washer and the seal such that the seal and the washer provide an inwardly acting force on the interleaved first and second lamellae that prevents a relative movement about the longitudinal axis of the pin and fixes a position of the valve stem with respect to the electronic module.

14. The method according to claim 12, which comprises securing the connection stem to the snap-in electronic module by a screw connection.

15. The method according to claim 14, which comprises inserting the connection stem into an aperture in the snap-in electronic module and meshing an inner thread of the connection stem with a screw positioned on an opposing side of the aperture.

* * * * *